United States Patent
Etemad et al.

(10) Patent No.: US 8,472,380 B2
(45) Date of Patent: Jun. 25, 2013

(54) METHOD AND APPARATUS FOR ENHANCED MULTICAST BROADCAST SERVICES

(75) Inventors: Kamran Etemad, Potomac, MD (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 334 days.

(21) Appl. No.: 12/846,533

(22) Filed: Jul. 29, 2010

(65) Prior Publication Data

US 2011/0044229 A1  Feb. 24, 2011

Related U.S. Application Data

(60) Provisional application No. 61/275,266, filed on Aug. 24, 2009.

(51) Int. Cl.
*H04W 4/00* (2009.01)
(52) U.S. Cl.
USPC .......................................... 370/328
(58) Field of Classification Search
USPC ................. 370/312, 328–350, 390
See application file for complete search history.

(56) References Cited

U.S. PATENT DOCUMENTS

| 7,664,070 B2 | 2/2010 | Van Dervelde et al. |
| 2006/0107287 A1 | 5/2006 | Lee et al. |
| 2010/0061286 A1* | 3/2010 | Ji et al. .................. 370/312 |
| 2010/0202336 A1* | 8/2010 | Cheng et al. ............ 370/312 |

FOREIGN PATENT DOCUMENTS

WO   2006074355   7/2006

OTHER PUBLICATIONS

International Search Report and Written Opinion for PCT Patent Application No. PCT/US2011/046511, mailed Apr. 20, 2011, 9 pages.

* cited by examiner

*Primary Examiner* — Frank Duong
(74) *Attorney, Agent, or Firm* — Kacvinsky Daisak PLLC

(57) ABSTRACT

A method, system, apparatus and article are described for managing enhanced multicast broadcast services. In some embodiments, for example, a first connection may be established using a first wireless communication protocol, scheduling information for one or more multicast or broadcast data services may be received using the first wireless communication protocol, one or more of the multicast or broadcast data services may be selected, and a second connection using a second wireless communication protocol may be established to receive the one or more selected multicast or broadcast data services. Other embodiments are described and claimed.

25 Claims, 6 Drawing Sheets

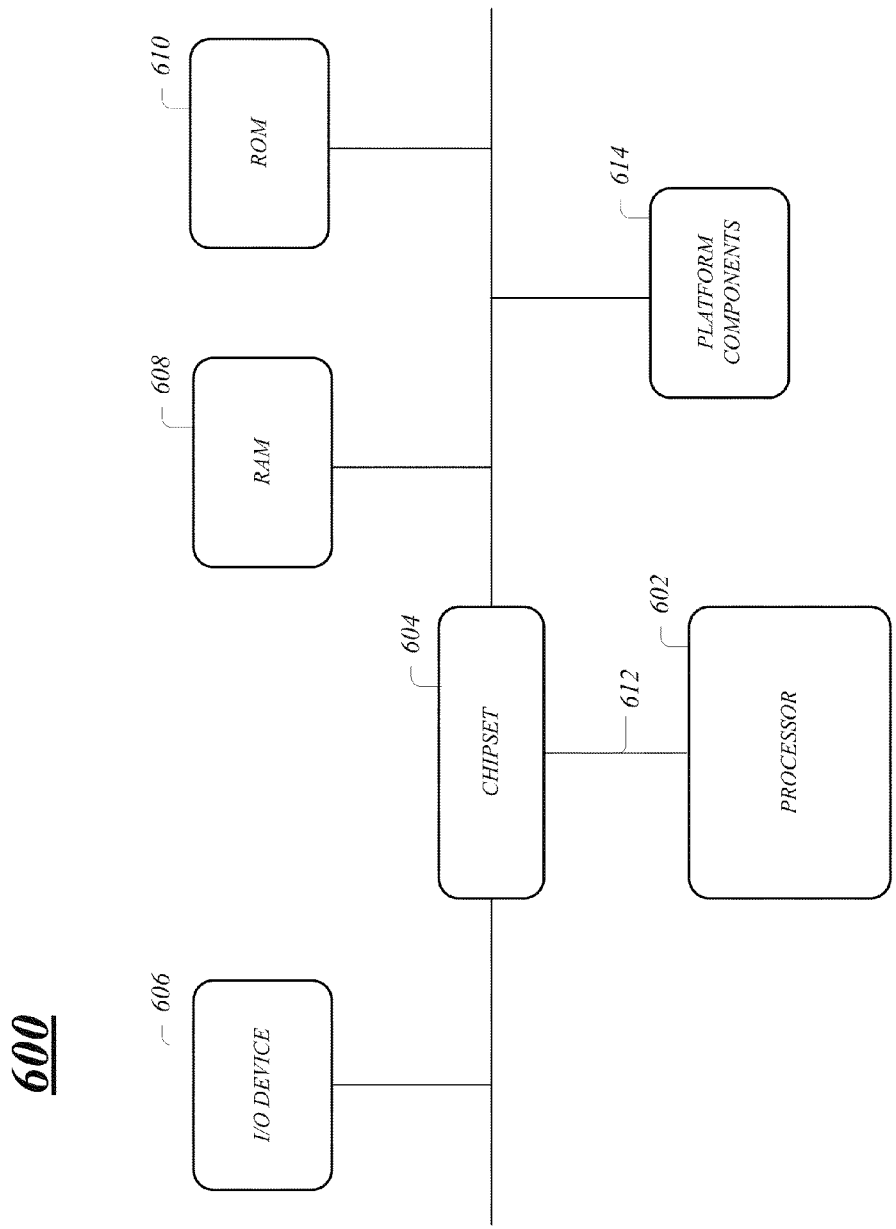

METHOD AND APPARATUS FOR ENHANCED MULTICAST BROADCAST SERVICES

CLAIM OF PRIORITY

This Application claims the benefit of U.S. Provisional Application No. 61/275,266, filed Aug. 24, 2009, the entire disclosure of which is herein incorporated by reference.

BACKGROUND

Wireless communication systems communicate information over a shared wireless communication medium such as one or more portions of the radio-frequency (RF) spectrum. Recent innovations in mobile computing devices and the increased availability of advanced, interactive, multimedia and other data services have resulted in increased demands placed on wireless communications systems. Furthermore, the limited bandwidth of wireless communications systems and the cost of transmission of data, among other factors, are important considerations when implementing wireless communications systems. One particular area that results in increased demands on a wireless communications system is multicast or broadcast data services. As the number and type of multicast and broadcast data services continues to increase, the demands placed on wireless communications systems and mobile computing devices also increase. Consequently, techniques designed to manage multicast and broadcast data services in a wireless communications system are desirable.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments may be generally directed towards the use of wireless connections operating according to one wireless communication protocol to receive or transmit scheduling information for multicast or broadcast data services in conjunction with the use of wireless connections operating according to a different wireless communication protocol to receive or transmit those multicast or broadcast data services. For example, various embodiments may comprise receiving scheduling information for one or more multicast or broadcast data services over a first wireless connection, selecting one of the one or more multicast or broadcast data services, and receiving the selected multicast or broadcast data service over a second wireless connection that operates according to a different wireless communication protocol than the first wireless connection. The embodiments are not limited to this example.

BRIEF DESCRIPTION OF THE DRAWINGS

FIG. 6 illustrates one embodiment of a second apparatus.

DETAILED DESCRIPTION

Figure 1:
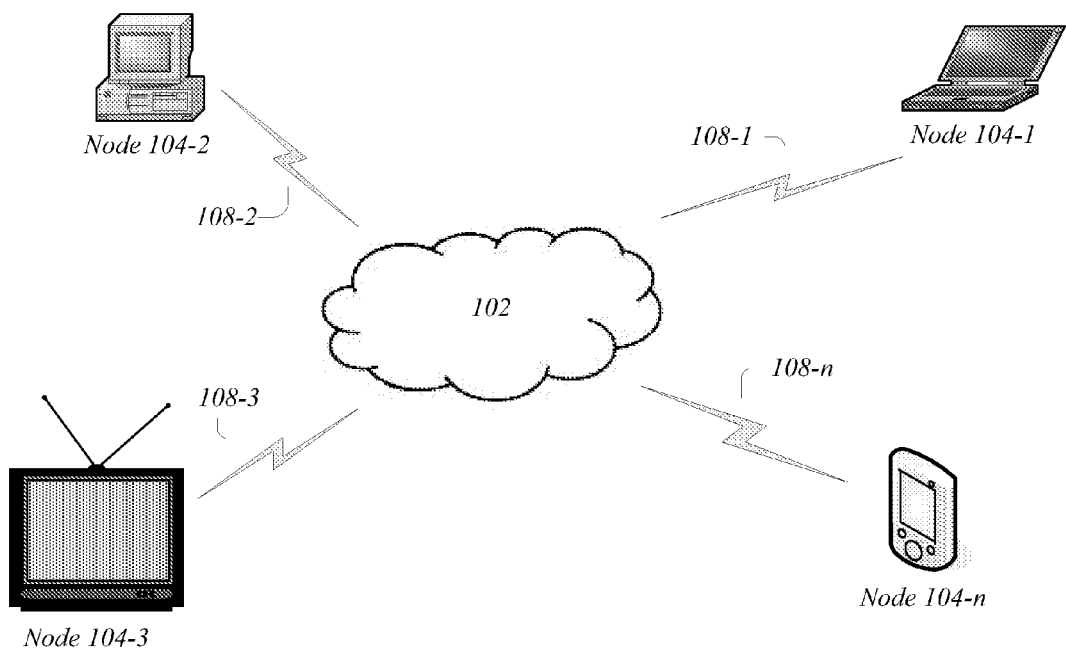
FIG. 1 illustrates one embodiment of a communications system.

Various embodiments may be generally directed to techniques to manage multicast and broadcast data services in a wireless communications system. Some embodiments may be particularly directed to enhanced methods for managing multicast and broadcast data services across a variety of wireless communication protocols, for example. Other embodiments are described and claimed.

Multicast and broadcast services (MBS) or enhanced multicast and broadcast services (EMBS) may comprise a mechanism to send a common data to one or more users. In some embodiments, for example, a wireless communications system may be operative to transmit multiple radio frequencies from one or more base stations or other network devices. For example, MBS data may be broadcast at a higher power than other data services, allowing a plurality of users in a coverage area to receive the MBS data as opposed to sending the MBS data to each user individually. In various embodiments, the MBS data may include, but is not limited to a combination of one or more of text, audio, still images, animation, video and interactive content. For example, the MBS data may comprise a pre-recorded television program, a movie, a live broadcast or other multimedia content. While a limited number and type of MBS data are shown for purposes of illustration, it should be understood that any suitable MBS data could be used and still fall within the described embodiments.

When multiple radio frequencies are deployed at a base station, a mobile computing device may be operative to tune to a particular frequency or use a particular wireless communication protocol to complete normal processing tasks, such as web browsing, email or any other suitable task. In some embodiments, however, the particular frequency to which the mobile computing device tunes into may not include the desired MBS data. In previous embodiments, to allow users to receive the MBS data, wireless communications system had to either broadcast on all the available frequencies or to transmit the MBS data on one particular frequency or using one particular wireless communication protocol and somehow indicate to users of mobile computing devices that they must switch to the broadcast carrier, frequency or protocol to receive the MBS data. Broadcasting the MBS data on all available frequencies consumes a large amount of bandwidth and can be costly for the network service provider or carrier.

In some embodiments, broadcasting MBS data on a plurality of frequencies or using a plurality of protocols and requiring mobile computing devices to simultaneously tune into each frequency or protocol may require multiple transceivers or wireless radios to be implemented at each mobile computing device. In various embodiments, this may result in expensive mobile computing devices and increased network usage, as multiple radios are required to be active at the same time. It may be advantageous, therefore, to avoid duplicating the same transmissions on multiple carriers, frequency or protocols and to avoid the need for each mobile computing device to include a plurality of wireless radios or transceivers. Consequently, techniques for wireless communications systems and mobile computing devices to efficiently manage MBS are desirable.

FIG. 1 illustrates a block diagram of one embodiment of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, the communications system 100 may comprise, or form part of a wired communications system, a wireless communications system, or a combination of both. For example, the communications system 100 may include one or more nodes arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The communications system 100 also may include one or more nodes arranged to communicate information over one or more types of wireless communication links. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands.

The communications system 100 may communicate information in accordance with one or more standards as promulgated by a standards organization. In one embodiment, for example, various devices comprising part of the communications system 100 may be arranged to operate in accordance with one or more of the IEEE 802.16 standards for WMAN including standards such as 802.16-2004, 802.16.2-2004, 802.16e-2005, 802.16f, 802.16m progeny and variants; WGA (WiGig) progeny and variants or a 3GPP Long-Term Evolution (LTE) standard. In some embodiments, the communications system 100 may be arranged to communicate in accordance with any fourth generation (4G) network or radio technology progeny and variants.

In various embodiments, the communications system 100 may be arranged to operate in accordance with one or more of the IEEE 802.11 standard, the WiGig Alliance™ specifications, WirelessHD™ specifications, standards or variants, such as the WirelessHD Specification, Revision 1.0d7, Dec. 1, 2007, and its progeny as promulgated by WirelessHD, LLC (collectively referred to as the "WirelessHD Specification"), or with any other wireless standards as promulgated by other standards organizations such as the International Telecommunications Union (ITU), the International Organization for Standardization (ISO), the International Electrotechnical Commission (IEC), the Institute of Electrical and Electronics Engineers (information IEEE), the Internet Engineering Task Force (IETF), and so forth. In various embodiments, for example, the communications system 100 may communicate information according to one or more IEEE 802.11 standards for wireless local area networks (WLANs) such as the information IEEE 802.11 standard (1999 Edition, Information Technology Telecommunications and Information Exchange Between Systems—Local and Metropolitan Area Networks—Specific Requirements, Part 11: WLAN Medium Access Control (MAC) and Physical (PHY) Layer Specifications), its progeny and supplements thereto (e.g., 802.11a, b, g/h, j, n, VHT SG, and variants); IEEE 802.15.3 and variants; European Computer Manufacturers Association (ECMA) TG20 progeny and variants; and other wireless networking standards. The embodiments are not limited in this context.

The communications system 100 may communicate, manage, or process information in accordance with one or more protocols. A protocol may comprise a set of predefined rules or instructions for managing communication among nodes. In various embodiments, for example, the communications system 100 may employ one or more protocols such as a beam forming protocol, medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), a contention-based period (CBP) protocol, a distributed contention-based period (CBP) protocol and so forth. In various embodiments, the communications system 100 also may be arranged to operate in accordance with standards and/or protocols for media processing. The embodiments are not limited in this context.

As shown in FIG. 1, the communications system 100 may comprise a network 102 and a plurality of nodes 104-1-$n$, where n may represent any positive integer value. In various embodiments, the nodes 104-1-$n$ may be implemented as various types of wireless devices. Examples of wireless devices may include, without limitation, a station, a subscriber station, a base station, a wireless access point (AP), a wireless client device, a wireless station (STA), a laptop computer, ultra-laptop computer, portable computer, personal computer (PC), notebook PC, handheld computer, personal digital assistant (PDA), cellular telephone, combination cellular telephone/PDA, smartphone, pager, messaging device, media player, digital music player, set-top box (STB), appliance, workstation, user terminal, mobile unit, consumer electronics, television, digital television, high-definition television, television receiver, high-definition television receiver, and so forth.

In some embodiments, the nodes 104-1-$n$ may comprise one more wireless interfaces and/or components for wireless communication such as one or more transmitters, receivers, transceivers, radios, chipsets, amplifiers, filters, control logic, network interface cards (NICs), antennas, antenna arrays, modules and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth.

In various embodiments, the nodes 104-1-$n$ may comprise or form part of a wireless network 102. In one embodiment, for example, the wireless network 102 may comprise a Worldwide Interoperability for Microwave Access (WiMAX) network. Although some embodiments may be described with the wireless network 102 implemented as a WiMAX wireless network for purposes of illustration, and not limitation, it can be appreciated that the embodiments are not limited in this context. For example, the wireless network 102 may comprise or be implemented as various types of wireless networks and associated protocols suitable for a Wireless Personal Area Network (WPAN), a Wireless Local Area Network (WLAN), a Wireless Metropolitan Area Network, a Wireless Wide Area Network (WWAN), a Broadband Wireless Access (BWA) network, a radio network, a cellular network, a television network, a satellite network such as a direct broadcast satellite (DBS) network, and/or any other wireless communications network configured to operate in accordance with the described embodiments. Other embodiments are described and claimed.

Figure 2:
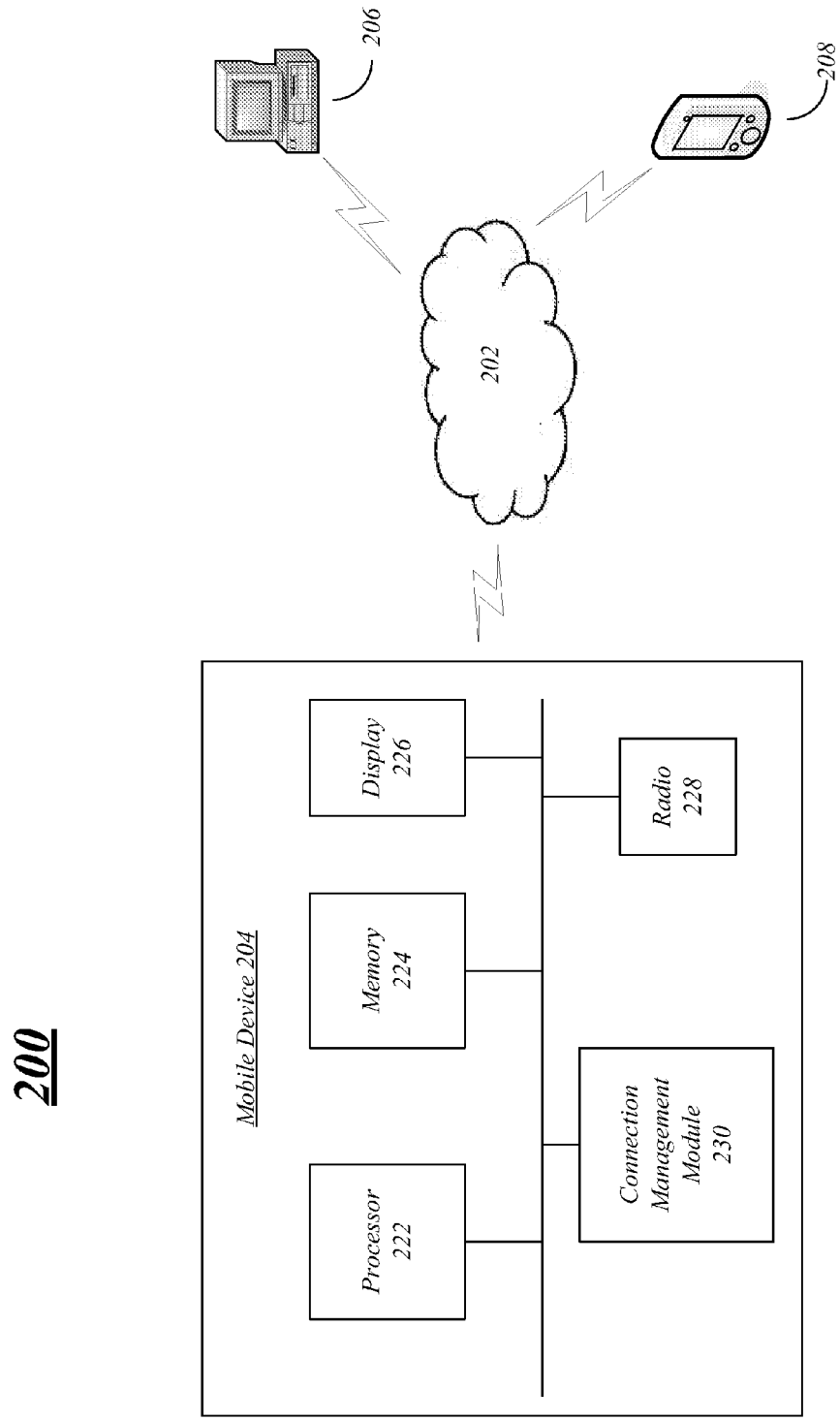
FIG. 2 illustrates one embodiment of a first apparatus.

FIG. 2 illustrates a first apparatus 200. As shown in FIG. 2, the first apparatus 200, which may comprise a wireless communications system similar to that described with reference to FIG. 1, may include nodes 204, 206 and 208 and wireless network 202. Wireless network 202 may comprise the same or a similar network to wireless network 102 described in FIG. 1. Nodes 204, 206 and 208 may comprise mobile computing device similar to nodes 104-1-n described in FIG. 1. As shown in FIG. 2, mobile computing device 204 has been expanded to show additional details of the device. It should be understood that any suitable device may contain the same or similar functionality and still fall within the described embodiments. Furthermore, while a limited number of mobile computing devices, wireless networks and modules are shown in FIG. 2 for purpose of illustration, it should be understood that the embodiments are not limited to the number or type of elements or modules shown in FIG. 2. Other embodiments are described and claimed.

In various embodiments, mobile computing device 204 may include a processor 222, a memory 224, a display 226, one or more radios or transceivers 228 and a connection management module 230. Mobile computing device 204 may be in wireless communication with one or more of mobile computing devices 206 and/or 208 using wireless network 202. For purposes of illustration, system 200 will be described hereinafter as a WiMAX system where mobile computing device 204 comprises a subscriber or user mobile computing device and devices 206 and 208 comprise base stations or other network devices operative to exchange information with or provide information to mobile computing device 204. The embodiments are not limited in this context.

As shown, mobile computing device 204 may comprise a processor 222. The processor 222 may be implemented as any processor, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processor 222 may be implemented as a general purpose processor, such as a processor made by Intel® Corporation, Santa Clara, Calif. The processor 222 may also be implemented as a dedicated processor, such as a controller, microcontroller, embedded processor, a digital signal processor (DSP), a network processor, a media processor, an input/output (I/O) processor, and so forth. The processor 222 may have any number of processor cores, including one, two, four, eight or any other suitable number. The embodiments are not limited in this context.

The mobile computing device 204 may comprise a memory 224 in some embodiments. The memory 224 may comprise any machine-readable or computer-readable media capable of storing data, including both volatile and non-volatile memory. For example, the memory 224 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of the memory 224 may be included on the same integrated circuit as the processor 222, or alternatively some portion or all of the memory 224 may be disposed on an integrated circuit or other medium, for example a hard disk drive, that is external to the integrated circuit of the processor 222. The embodiments are not limited in this context.

As further shown in FIG. 2, the mobile devices 204 may comprise a display 226. Display 226 may comprise any suitable display unit for displaying information appropriate for a mobile computing device. In addition, display 226 may be implemented as an additional I/O device, such as a touch screen, touch panel, touch screen panel, and so forth. Touch screens may comprise display overlays which are implemented using one of several different techniques, such as pressure-sensitive (resistive) techniques, electrically-sensitive (capacitive) techniques, acoustically-sensitive (surface acoustic wave) techniques, photo-sensitive (infra-red) techniques, and so forth. The effect of such overlays may allow a display to be used as an input device, to remove or enhance the keyboard and/or the mouse as the primary input device for interacting with content provided on display 226.

In one embodiment, for example, display 226 may be implemented by a liquid crystal display (LCD) or other type of suitable visual interface. Display 226 may comprise, for example, a touch-sensitive color display screen. In various implementations, the display 226 may comprise one or more thin-film transistors (TFT) LCD including embedded transistors. In such implementations, the display 226 may comprise a transistor for each pixel to implement an active matrix. While the embodiments are not limited in this context, an active matrix display may be desirable since it requires lower current to trigger pixel illumination and is more responsive to change than a passive matrix.

In various embodiments, mobile computing device 204 may communicate information over a wireless shared media or network 202 via radio 228. The wireless shared media or network 202 may comprise one or more allocations of RF spectrum. The allocations of RF spectrum may be contiguous or non-contiguous. In some embodiments, the radio 228 may communicate information over the wireless shared media or network 202 using various multicarrier techniques utilized by, for example, WiMAX or WiMAX II systems. For example, the radio 228 may utilize various MU-MIMO techniques to perform beamforming, spatial diversity or frequency diversity.

In general operation, the radio 228 may communicate information using one or more communications channels. The radio 228 may comprise any suitable wireless radio or transceiver operative to communicate in accordance with any number of wireless communication protocols, wireless carrier signals and/or frequencies. A communication channel may be a defined set of frequencies, time slots, codes, or combinations thereof. In one embodiment, for example, the transmitting or receiving portion of the radio 228 of mobile computing device 204 may communicate media and control information to or from the receiving or transmitting portion of a radio of mobile computing devices 206 and/or 208. In some embodiments, the communications channels may use the same or different sets of transmit and/or receive frequencies, depending upon a given implementation. For example, radio 228 may be configured to send/receive information using a plurality of protocols from any number of wireless standards. In some embodiments, radio 228 may be configured to send/receive information or data in accordance with a 802.16m protocol and a 802.16e protocol, for example.

In some embodiments, mobile computing device 104 may include connection management module 230. Connection management module 230 may be operative to establish a first connection using a first wireless carrier signal in various embodiments. For example, mobile computing device 204 may primarily communicate using a first wireless carrier signal in accordance with a 802.16m protocol, and a first connection may be established according to this protocol. In some embodiments, scheduling information for one or more multicast or broadcast data services may be received using the first connection. For example, the scheduling information may comprise one or more of timing and frequency information for one or more multicast or broadcast data services. In some embodiments, the scheduling information may be used by connection management module 230 to determine what type of programming is available, and when and where the programming is available.

One or more of the multicast or broadcast data services may be selected by the connection management 230 in various embodiments. For example, a user may indicate a desire to watch or subscribe to a particular television program or channel that is available via a multicast or broadcast data service. In turn, connection management module 230 may be operative to select or identify the time and frequency for the multicast or broadcast of this program or channel, and may further be operative to establish a second connection using a second wireless carrier signal to receive the one or more selected multicast or broadcast data services. In various embodiments, the first and second wireless carrier signals may operate using different radio frequencies, standards, protocols or other transmission parameters.

For example, in some embodiments, the scheduling information may indicate that a desired multicast or broadcast data service is available over frequencies or using a carrier that operates in accordance with a 802.16e standard or protocol, while mobile computing device 204 may be operative to communicate by default according to a 802.16m protocol or standard. In this situation, in some embodiments, connection management module 230 may be operative to use the scheduling information to determine when radio 228 should tune into the described 802.16e frequencies or carriers to receive the multicast or broadcast data services. In various embodiments, the first and second connections are established using a same wireless transceiver or radio 228. As a result, connection management module 230 may allow mobile computing device 204 to utilize frequencies or carriers associated with 802.16e and 802.16m using the same radio, which may allow a mobile computing device designed primarily for use in a 802.16m network to receive multicast broadcast data services that are transmitted using a legacy 802.16e network.

In various embodiments, the connection management module 230 may be operative to periodically establish wireless connections using the second wireless carrier signal to receive scheduled portions of the one or more multicast or broadcast data services. In some embodiments, the periodically established wireless connections may be based on timing and frequency information contained in the scheduling information. For example, the multicast or broadcast data services may sent in the form of packets or segments that are available at a plurality of different times and/or frequencies, wherein the packets or segments comprise only a portion of the entire multicast or broadcast data. In some embodiments, the timing and frequency of the multicast or broadcast for each segment or portion of the data may be included with the scheduling information. The connection management module 230 may be operative to use this information to periodically establish a connection using the second wireless carrier to receive each portion or segment of the multicast or broadcast data as it becomes available.

In some embodiments, the connection management module 230 may be operative to establish a third connection using the first wireless carrier signal or re-establish the first connection using the first wireless carrier signal after receiving the one or more selected multicast or broadcast data services. For example, after receiving the designated portion or segment of the multicast or broadcast data at the assigned time, the connection management module 230 may be operative to resume normal data operations and/or connections using the first wireless carrier signal or to establish a new connection using the same protocol, carrier or standard that was used to initially establish the first connection. Other embodiments are described and claimed.

Figure 3:
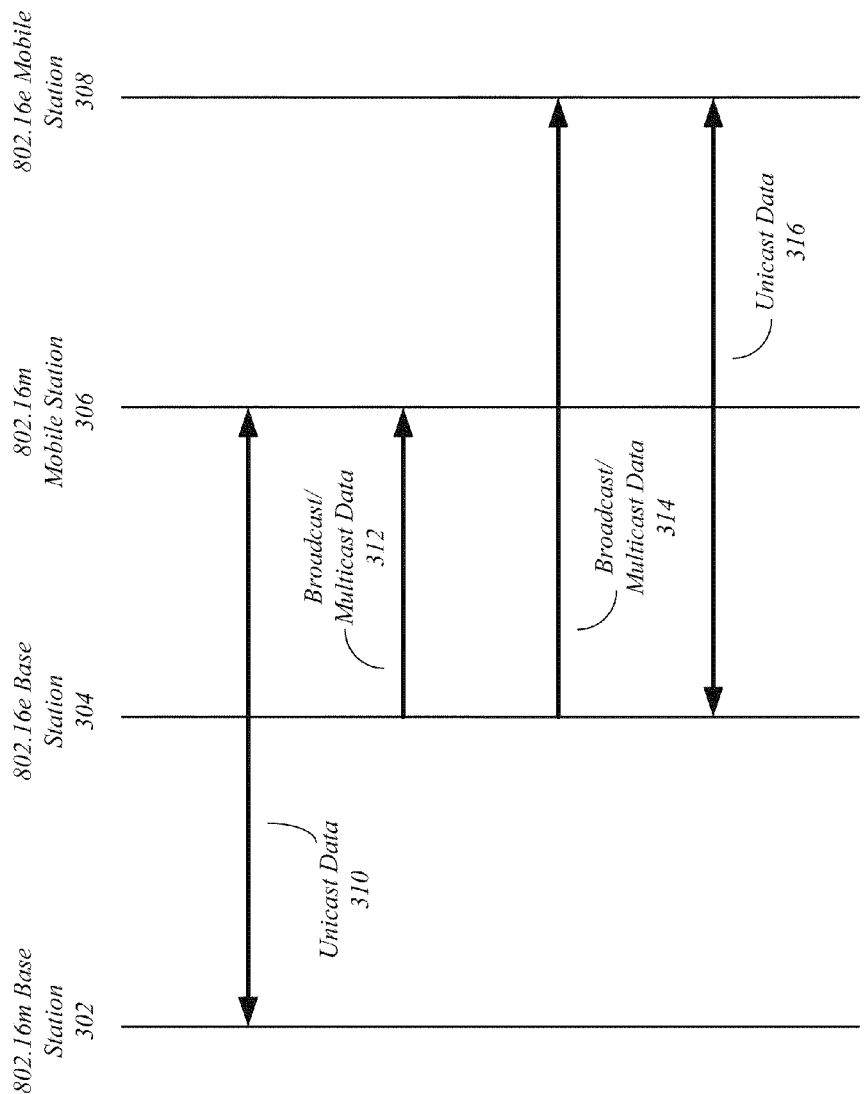
FIG. 3 illustrates one embodiment of a first transmission diagram.

FIG. 3 illustrates an example transmission diagram for wireless networks, such as wireless networks 102 and 202, in some embodiments. Wireless networks 102 and 202 may represent, in some embodiments, wireless networks implementing a WiMAX wireless network which may include, in some embodiments, a combination of a plurality of protocols and standards, as described above. For example, the transmission diagram of FIG. 3 may illustrate, in some embodiments, a wireless network that includes a combination of 802.16e and 802.16m base stations and mobile stations. More particularly, FIG. 3 illustrates a 802.16m base station 302, a 802.16e base station 304, a 802.16m mobile station 306 and a 802.16e mobile station 308. While a limited number and type of mobile stations and base stations are shown for purposes of illustrations, the embodiments are not limited in this context.

As shown in FIG. 3, 802.16m base station 203 may be operative to establish a unicast data connection 310 with only the 802.16m mobile station that operates according to the same wireless protocol. Likewise, 802.16e base station 304 may only be capable of establishing a unicast data connection 316 with 802.16e mobile station 308 that operates according to the same wireless protocol. As shown, the mobile stations and base stations that operate according to the same wireless protocols are capable of establishing bi-directional unicast connections with their corresponding mobile station or base station. In various embodiments, however, the 802.16e base station 304 is capable of establishing a broadcast or multicast data connection 312 and 314 with both an 802.16m mobile station 306 and/or a 802.16e mobile station 308. As a result, in some embodiments, the 802.16m mobile station 306 may be required to tune into the multicast or broadcast data connection 312 from the 802.16e base station in addition to the default unicast data connection 310 from the 802.16m base station. The switching mechanism to allow for this is described above with reference to FIGS. 1 and 2 and below with respect to FIGS. 4-6. Other embodiments are described and claimed.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

Figure 4:
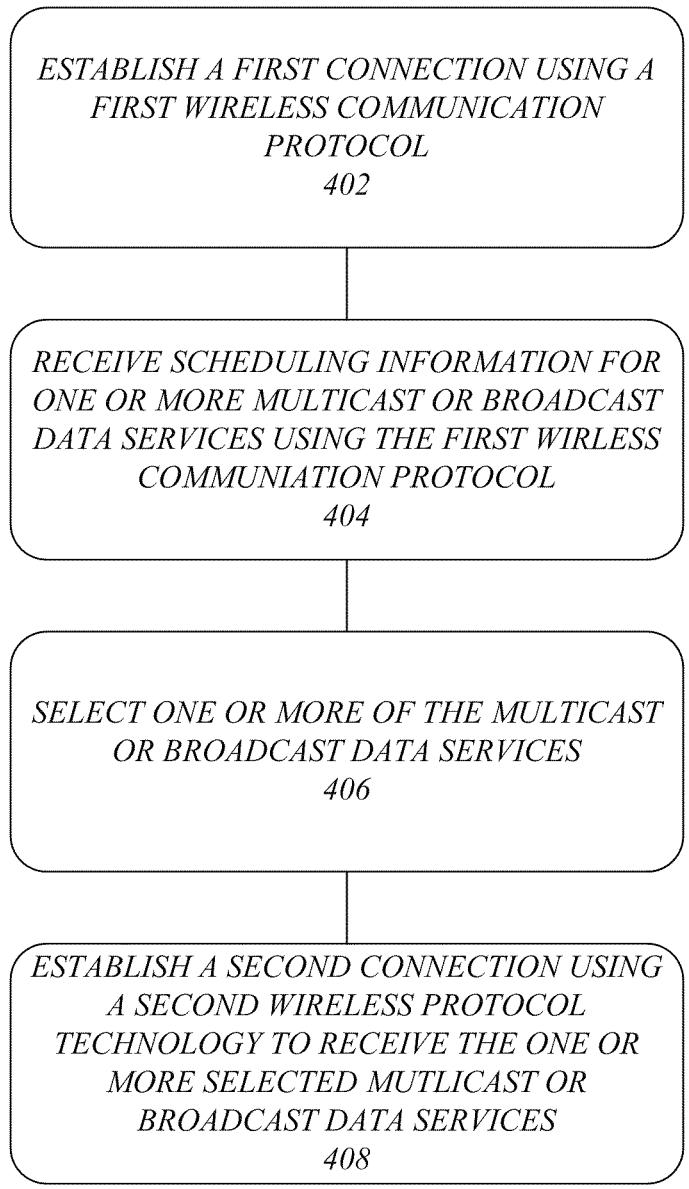
FIG. 4 illustrates one embodiment of a logic flow.

FIG. 4 illustrates one embodiment of a logic flow 400 for enabling management of MBS data in a wireless communications system. In various embodiments, the logic flow 400 may be performed by various systems, nodes, and/or modules and may be implemented as hardware, software, and/or any combination thereof, as desired for a given set of design parameters or performance constraints. For example, the logic flow 400 may be implemented by a logic device (e.g., node, STA, wireless device) and/or logic comprising instructions, data, and/or code to be executed by a logic device. For purposes of illustration, and not limitation, the logic flow 400 is described with reference to FIGS. 1-3. The embodiments are not limited in this context.

In various embodiments, a first connection may be established using a first wireless communication protocol at 402. For example, a mobile computing device, such as mobile computing device 204 of FIG. 2, may establish a first wireless connection in accordance with a 802.16m or LTE protocol. At 404, in some embodiments, scheduling information for one or more multicast or broadcast data services may be received using the first wireless communication protocol. For example, mobile computing device 204 may receive scheduling information comprising one or more of timing and frequency information for the multicast or broadcast data services from a base station, such as device 206, over the established 802.16m or LTE wireless connection.

The scheduling information may be received during a Dynamic Service Flow Activation (DSA) period in some embodiments. For example, mobile computing device 204 may enter network 202 and performabilities negotiations with one or more of base stations 206 or 208. In various embodiments, the mobile computing device 204 may then subscribe and connect to the network 202. The mobile computing device 204 may then interact with the network 202 and base stations 206 and/or 208 and receive data or other information pertaining to unicast, multicast and/or broadcast services that are available and the mobile computing device 204 may identify the programs, subscriptions, flows, data streams or other available data that are desired. In some embodiments, the negotiation procedures may comprise upper layer services that trigger one or more media access control (MAC) layer behaviors to create service flows that the mobile station can identify as service flows associated with the content to which the user or mobile computing device 204 has subscribed. For example, each of a plurality of television channels may be mapped to a particular service flow and each service flow may include different attributes.

In various embodiments, the scheduling information may comprise additional information that is indicated by the network or one or more of base stations 206 or 208 during the creation of the service flows for the subscription or MBS data. For example, the additional or scheduling information may comprise or include carrier information that is provided to mobile computing device 204, such as the frequency, timing or other attributes associated with the MBS data. In some embodiments, mobile computing device 204 may default to using its primary carrier or network, such as 802.16m in the current example. If however, the desired MBS data is available on a different carrier or frequency, the scheduling information may provide the mobile computing device 204 with the information necessary to identify, locate and receive the desired MBS data. Other embodiments are described and claimed.

In some embodiments, one or more of the multicast or broadcast data services may be selected at 406. For example, mobile computing device 204 may select or may receive an input representing a selection from a user indicating which of the one or more multicast or broadcast data services is desired. In various embodiments the one or more multicast or broadcast multimedia programs may comprise a combination of one or more of text, audio, still images, animation, video and interactive content, such as a broadcast or multicast of a live event, a telecast of a television program, a movie or any other prerecorded event or entertainment vehicle.

A second connection may be established using a second wireless communication protocol to receive the one or more selected multicast or broadcast data services in various embodiments. For example, mobile computing device 204 may initiate a connection using 802.16e to receive the MBS data if the scheduling information indicates that that is where the desired content will be available. The second connection may be periodically establishing based on the timing and frequency information to receive subsequent portions of the one or more multicast or broadcast data services. For example, the MBS data may be multicast or broadcast in packets or segments that are available at different time slots, wherein the data contained in the different time slots taken together as a whole may represent the desired MBS data.

In some embodiments, the first and second connections may be established using a same wireless transceiver. For example, radio 228 of mobile computing device 204 may be operative to switch between connections that operate in accordance with 802.16m and 802.16e in response to signals, control or other commands from the connection management module 230 indicating the timing for each connection. In some embodiments, a third connection may be established using the first wireless communication protocol or re-established using the first connection after receiving the one or more selected multicast or broadcast data services. For example, when a connection in accordance with 802.16e is not needed to receive the MBS data, connection management module 230 may initiate or re-establish the initial connection in accordance with 802.16m to continue normal data operations for mobile computing device 204.

The first and second wireless communication technologies may comprise different versions of a same wireless standard or wireless communication technologies that use different frequencies in various embodiments. For example, the first wireless communication protocol may operate in accordance with 802.16m or LTE and the second wireless communication protocol may operate in accordance with 802.16e. In some embodiments, the second wireless communication protocol may comprise a wireless carrier, protocol or frequency designated specifically for multicast or broadcast data services. Other embodiments are described and claimed.

Figure 5:
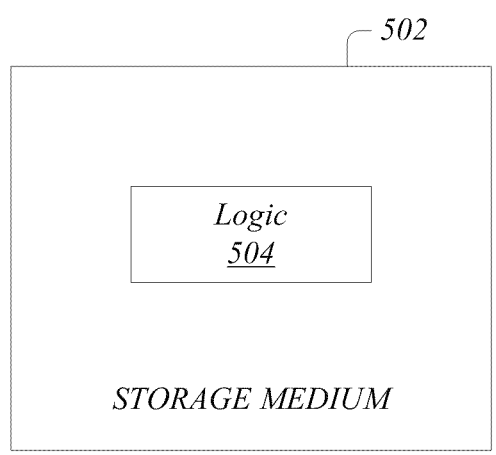
FIG. 5 illustrates one embodiment of an article of manufacture.

FIG. 5 illustrates one embodiment of an article of manufacture 500. As shown, the article 500 may comprise a storage medium 502 to store logic 504 for managing MBS in some embodiments. For example, logic 504 may be used to implement a connection management module for a mobile computing device, node or other system, as well as other aspects of nodes 104-1-$n$, for example. In various embodiments, the article 500 may be implemented by various systems, nodes, and/or modules.

The article 500 and/or machine-readable or computer-readable storage medium 502 may include one or more types of computer-readable storage media capable of storing data, including volatile memory or, non-volatile memory, removable or non-removable memory, erasable or non-erasable memory, writeable or re-writeable memory, and so forth. In some embodiments, the store medium 502 may comprise a non-transitory storage medium. Examples of a machine-readable storage medium may include, without limitation, random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other type of computer-readable storage media suitable for storing information. Moreover, any media involved with downloading or transferring a computer program from a remote computer to a requesting computer carried by data signals embodied in a carrier wave or other propagation medium through a communication link (e.g., a modem, radio or network connection) is considered computer-readable storage media.

The article 500 and/or machine-readable medium 502 may store logic 504 comprising instructions, data, and/or code that, if executed by a machine, may cause the machine to perform a method and/or operations in accordance with the described embodiments. Such a machine may include, for example, any suitable processing platform, computing platform, computing device, processing device, computing system, processing system, computer, processor, or the like, and may be implemented using any suitable combination of hardware and/or software.

The logic 504 may comprise, or be implemented as, software, a software module, an application, a program, a subroutine, instructions, an instruction set, computing code, words, values, symbols or combination thereof. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context. When the logic 504 is implemented as software, any suitable processor and memory unit may execute the software.

FIG. 6 is a diagram of an exemplary system embodiment. In particular, FIG. 6 is a diagram showing a system 600, which may include various elements. For instance, FIG. 6 shows that system 600 may include a processor 602, a chipset 604, an input/output (I/O) device 606, a random access memory (RAM) (such as dynamic RAM (DRAM)) 608, and a read only memory (ROM) 610, and various platform components 614 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 6, I/O device 606, RAM 608, and ROM 610 are coupled to processor 602 by way of chipset 604. Chipset 604 may be coupled to processor 602 by a bus 612. Accordingly, bus 612 may include multiple lines.

Processor 602 may be a central processing unit comprising one or more processor cores and may include any number of processors having any number of processor cores. The processor 602 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 600 may include various interface circuits, such as an Ethernet interface and/or a Universal Serial Bus (USB) interface, and/or the like. In some exemplary embodiments, the I/O device 606 may comprise one or more input devices connected to interface circuits for entering data and commands into the system 600. For example, the input devices may include a keyboard, mouse, touch screen, track pad, track ball, isopoint, a voice recognition system, and/or the like. Similarly, the I/O device 606 may comprise one or more output devices connected to the interface circuits for outputting information to an operator. For example, the output devices may include one or more digital displays, printers, speakers, and/or other output devices, if desired. For example, one of the output devices may be a digital display. The display may be a cathode ray tube (CRTs), liquid crystal displays (LCDs), light emitting diode (LED) display or any other type of display.

The system 600 may also have a wired or wireless network interface to exchange data with other devices via a connection to a network. The network connection may be any type of network connection, such as a wireless connection or a wired connection, including but not limited to a cellular connection, radio frequency connection, an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

The foregoing represent are only a few examples of the problems that may be overcome by implementing a method and apparatus to manage MBS data in a wireless communications system, and it may be appreciated that other problems may be overcome and other advantages may exist as well.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It is also worthy to note that any reference to "one embodiment" or "an embodiment" means that a particular feature, structure, or characteristic described in connection with the embodiment is included in at least one embodiment. Thus, appearances of the phrases "in one embodiment" or "in an embodiment" in various places throughout the specification are not necessarily all referring to the same embodiment. Furthermore, the particular features, structures or characteristics may be combined in any suitable manner in one or more embodiments.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A computer-implemented method, comprising:
establishing a first wireless connection using a first wireless communication protocol;
receiving scheduling information for one or more multicast or broadcast data services using the first wireless communication protocol;
selecting one or more of the multicast or broadcast data services; and
establishing a second wireless connection using a second wireless communication protocol to receive the one or more selected multicast or broadcast data services;
wherein the first wireless communication protocol operates in accordance with a first Institute of Electrical and Electronics Engineers (IEEE) 802.16 standard, the second wireless communication protocol operates in accordance with a second IEEE 802.16 standard that differs from the first IEEE 802.16 standard, and the first and second wireless connections are established using a same wireless transceiver.

2. The computer-implemented of claim 1, comprising:
establishing a third wireless connection using the first wireless communication protocol or re-establishing the first wireless connection after receiving the one or more selected multicast or broadcast data services.

3. The computer-implemented method of claim 1, the scheduling information comprising one or more of timing and frequency information for the multicast or broadcast data services.

4. The computer-implemented method of claim 3, comprising:
periodically establishing the second wireless connection based on the timing and frequency information to receive subsequent portions of the one or more multicast or broadcast data services.

5. The computer-implemented method of claim 1, wherein the first and second wireless communication protocols comprise different frequencies.

6. The computer-implemented method of claim 1, wherein the first wireless communication protocol operates in accordance with an IEEE 802.16m standard and the second wireless communication protocol operates in accordance with an IEEE 802.16e standard.

7. The computer-implemented method of claim 1, comprising:
receiving the scheduling information during a Dynamic Service Flow Activation (DSA) period.

8. The computer-implemented method of claim 1, wherein the second wireless communication protocol comprises a wireless carrier designated for multicast or broadcast data services.

9. An apparatus, comprising:
a connection management module operative to establish a first wireless connection using a first wireless carrier signal that operates in accordance with a first Institute of Electrical and Electronics Engineers (IEEE) 802.16 standard, receive scheduling information for one or more multicast or broadcast data services using the first wireless connection, select one or more of the multicast or broadcast data services, and establish a second wireless connection using a second wireless carrier signal to receive the one or more selected multicast or broadcast data services, the second wireless carrier signal operating in accordance with a second IEEE 802.16 standard that differs from the first IEEE 802.16 standard; and
one or more wireless transceivers, wherein the first and second wireless connections are established using a same wireless transceiver.

10. The apparatus of claim 9, the connection management module operative to establish a third wireless connection using the first wireless carrier signal or re-establish the first wireless connection using the first wireless carrier signal after receiving the one or more selected multicast or broadcast data services.

11. The apparatus of claim 9, the connection management module operative to periodically establish wireless connections using the second wireless carrier signal to receive scheduled portions of the one or more multicast or broadcast data services.

12. The apparatus of claim 11, wherein the periodically established wireless connections are based on timing and frequency information contained in the scheduling information.

13. The apparatus of claim 9, wherein the first and second wireless carrier signals operate using different radio frequencies.

14. The apparatus of claim 9, wherein the first wireless carrier signal operates in accordance with an IEEE 802.16m standard and the second wireless carrier signal operates in accordance with an IEEE 802.16e standard.

15. An article comprising a non-transitory computer-readable storage medium containing instructions that if executed by a processor enable a system to:
establish a first wireless connection using a first radio frequency;
receive scheduling information for one or more multicast or broadcast multimedia programs using the first wireless connection;
select one or more of the multicast or broadcast multimedia programs; and
periodically establish a second wireless connection using a second radio frequency to receive portions of the one or more selected multicast or broadcast multimedia programs based on the received scheduling information;
wherein the first wireless connection operates in accordance with a first Institute of Electrical and Electronics Engineers (IEEE) 802.16 standard, the second wireless connection operates in accordance with a second IEEE 802.16 standard that differs from the first IEEE 802.16 standard, and the first and second wireless connections are established using a same wireless transceiver.

16. The article of claim 15, wherein the first and second radio frequencies comprise different radio frequencies.

17. The article of claim 15, comprising instructions that if executed enable the system to:
establish a third wireless connection using the first radio frequency or re-establish the first wireless connection using the first radio frequency after one or more of the periodically established second connections.

18. The article of claim 15, wherein the scheduling information comprises one or more of timing or frequency information for the multicast or broadcast multimedia programs.

19. The article of claim 15, wherein the one or more multicast or broadcast multimedia programs comprise a combination of one or more of text, audio, still images, animation, video and interactive content.

20. The article of claim 15, wherein the one or more multicast or broadcast multimedia programs comprise a broadcast or multicast of a live event.

21. The article of claim 15, wherein the one or more multicast or broadcast multimedia programs comprise a broadcast or multicast of a prerecorded event.

22. The article of claim 15, wherein the first wireless connection operates in accordance with an IEEE 802.16m standard and the second wireless connection operates in accordance with IEEE 802.16e standard.

23. A system, comprising:
a digital display; and
connection management module coupled to one or more wireless transceivers, wherein the connection management module is operative to establish a first wireless connection using a first wireless carrier signal that operates in accordance with a first Institute of Electrical and Electronics Engineers (IEEE) 802.16 standard, receive scheduling information for one or more multicast or broadcast data services using the first wireless connection, select one or more of the multicast or broadcast data services, and establish a second wireless connection using a second wireless carrier signal to receive the one or more selected multicast or broadcast data services, the second wireless carrier signal operating in accordance with a second IEEE 802.16 standard that differs from the first IEEE 802.16 standard, wherein the first and second wireless connections are established using a same wireless transceiver.

24. The system of claim 23, wherein the first wireless carrier signal operates in accordance with an IEEE 802.16m standard and the second wireless carrier signal operates in accordance with an IEEE 802.16e standard.

25. The system of claim 23, the connection management module operative to establish a third wireless connection using the first wireless carrier signal or re-establish the first wireless connection using the first wireless carrier signal after receiving the one or more selected multicast or broadcast data services and to periodically establish wireless connections using the second wireless carrier signal to receive scheduled portions of the one or more multicast or broadcast data services, wherein the periodically established wireless connections are based on timing and frequency information contained in the scheduling information.

\* \* \* \* \*

UNITED STATES PATENT AND TRADEMARK OFFICE
CERTIFICATE OF CORRECTION

PATENT NO. : 8,472,380 B2
APPLICATION NO. : 12/846533
DATED : June 25, 2013
INVENTOR(S) : Kamran Etemad et al.

It is certified that error appears in the above-identified patent and that said Letters Patent is hereby corrected as shown below:

In the Drawings:

On sheet 4 of 6, in Figure 4, Reference Number 404, line 4, delete "COMMUNIATION" and insert -- COMMUNICATION --, therefor.

In the Claims:

In column 14, line 63, in claim 2, delete "of" and insert -- method of --, therefor.

In column 16, line 46, in claim 22, delete "with" and insert -- with an --, therefor.

Signed and Sealed this
Seventeenth Day of September, 2013

Teresa Stanek Rea
*Deputy Director of the United States Patent and Trademark Office*